US011401064B2

(12) United States Patent
Beesley

(10) Patent No.: US 11,401,064 B2
(45) Date of Patent: Aug. 2, 2022

(54) AIR TRANSFER BAG DEFLATOR

(71) Applicant: ILLINOIS TOOL WORKS INC., Glenview, IL (US)

(72) Inventor: Robert C. Beesley, Greenville, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 331 days.

(21) Appl. No.: 16/103,961

(22) Filed: Aug. 16, 2018

(65) Prior Publication Data

US 2019/0135465 A1    May 9, 2019

Related U.S. Application Data

(60) Provisional application No. 62/546,385, filed on Aug. 16, 2017.

(51) Int. Cl.
| | | |
|---|---|---|
| *B65B 21/16* | (2006.01) | |
| *B65G 47/90* | (2006.01) | |
| *B65B 39/02* | (2006.01) | |
| *B65B 21/18* | (2006.01) | |

(52) U.S. Cl.
CPC ............ *B65B 21/16* (2013.01); *B65B 21/186* (2013.01); *B65B 39/02* (2013.01); *B65G 47/908* (2013.01); *B65G 2201/0244* (2013.01)

(58) Field of Classification Search
CPC .......... B65G 2201/0244; B65G 47/908; B65B 21/16; B65B 21/186; B65B 39/02
USPC ........................................................... 53/531
See application file for complete search history.

(56) References Cited

U.S. PATENT DOCUMENTS

| | | | |
|---|---|---|---|
| 4,709,536 A | 12/1987 | Hartness et al. | |
| 4,835,946 A * | 6/1989 | Hartness ................. | B65B 21/06 |
| | | | 53/247 |
| 2013/0102772 A1* | 4/2013 | Eshima ..................... | G21G 1/10 |
| | | | 536/28.2 |

OTHER PUBLICATIONS

GELISIM (http://gelisimvalf.com.tr/en/use-advantages-and-disadvantages-of-valves/; article titled "Use Advantages and Disadvantages of Valves", posted Apr. 23, 2013). (Year: 2013).*

* cited by examiner

*Primary Examiner* — Eyamindae C Jallow
*Assistant Examiner* — Himchan Song
(74) *Attorney, Agent, or Firm* — Pauley Erickson & Swanson

(57) ABSTRACT

A case packing apparatus for loading articles into a case that includes two or more airbags adapted to be positioned above the case; a vacuum reservoir positioned in fluid communication with the airbags; and a supply of compressed gas positioned in fluid communication with the airbags.

14 Claims, 2 Drawing Sheets

AIR TRANSFER BAG DEFLATOR

CROSS REFERENCE TO RELATED APPLICATION

This application claims the benefit of U.S. Provisional Application, Ser. No. 62/546,385, filed on 16 Aug. 2017. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates to an air transfer system for vertical loading an empty box.

Description of Prior Art

U.S. Pat. Nos. 4,709,536 and 4,835,946 cover an air transfer system for vertical load packers. The aforementioned patents describe a system using inflatable bladders or air bags to grip a grouping of articles, such as bottles, and transport them over an empty box. The bladders are then deflated and the bottles drop into the box.

In particular, a case packing machine may include a transfer system for transporting groups of articles from a continuously-running infeed conveyor of the case packing machine to a case loading station. The article transport apparatus includes a reciprocating carriage having longitudinally extending airbags or bladders which are inflatable for gripping a group of articles to the carriage. The reciprocating carriage moves upstream to encompass a group of articles, and upon inflation of the bladders, the bladders grip the group of articles to the carriage. The carriage then moves downstream, and upon deflation of the bladders, deposits the group of articles at the loading station. As the reciprocating carriage moves away from the infeed conveyor towards the loading station, a space free of articles, or gap, is created temporarily on the infeed conveyor, through which a pivoting stop bar arrangement pivots upwardly from below the infeed conveyor to a position above the infeed conveyor for restraining the articles on the infeed conveyor. The pivoting stop bar arrangement restrains the articles on the infeed conveyor until the reciprocating carriage returns to grip another group of articles. Individual lane conveyors are provided between conveyor lane dividers which allow the conveyor lane dividers to be supported from lower portions thereof.

In the prior art and in the current invention, it is important that the airbags are deflated with a source of vacuum. Simply opening the airbags to atmosphere is not good enough. The airbags must fully deflate and flatten rather than simply going slack. This allows the articles to drop quickly and in unison rather than dropping one by one. When articles are allowed to get ahead of one another, they may collide with one another in the box and cause a jam. The prior art airbags have traditionally been deflated using an air powered Venturi pump.

Problems with the existing systems are threefold. Firstly, Venturi pumps consume large amounts of compressed air. It takes from 5-10 compressor horsepower to run the existing systems. Secondly, even with the Venturi pump, the air bags often don't deflate fast enough for all applications. Thirdly, some applications may require multiple cases or boxes with more air bags. Deflation speed problems are exacerbated in such applications.

SUMMARY OF THE INVENTION

The present invention is directed to an air transfer system using a vacuum reservoir and a fast-acting diaphragm valve to deflate the airbags quicker. The system according to a preferred embodiment of this invention uses an electrically driven vacuum pump to maintain a vacuum on a reservoir. The vacuum pump preferably runs continuously to permit a smaller capacity and thus a smaller load and smaller footprint than the prior art systems. The prior art systems deflate the air bags directly. The subject invention using a reservoir permits continuous removal of air using a small capacity pump. The reservoir is preferably sized to remove all the air in the air bags and still maintain a vacuum to draw the air bags flat.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1A:
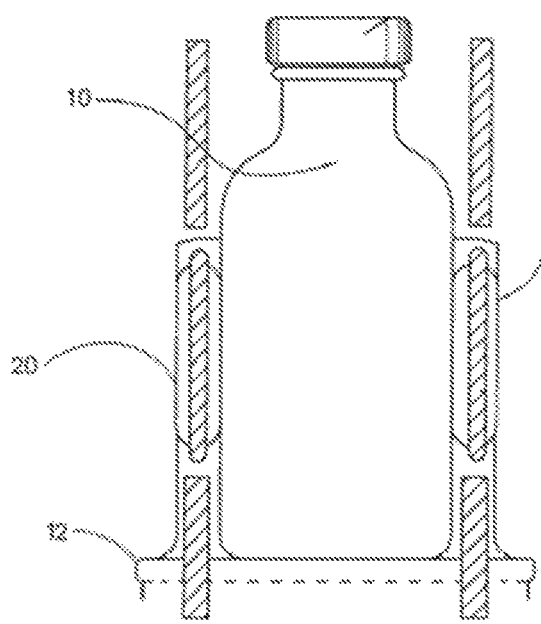
FIG. 1A shows a front view of an airbag in an uninflated state around an article.
Figure 1B:
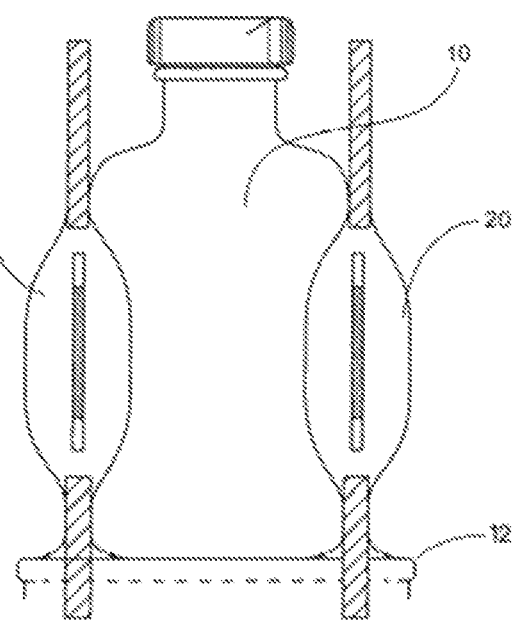
FIG. 1B shows a front view of the airbag in FIG. 1A in an inflated state around the article.

FIGS. 1A and 1B show airbags 20 in an uninflated state and an inflated state, respectively. In the inflated state shown in FIG. 1B, the articles 10, such as bottles shown in the figures, are moveable from a first loading position to a position over a box or carton where they are released upon deflation of the airbags 20.

Figure 2:
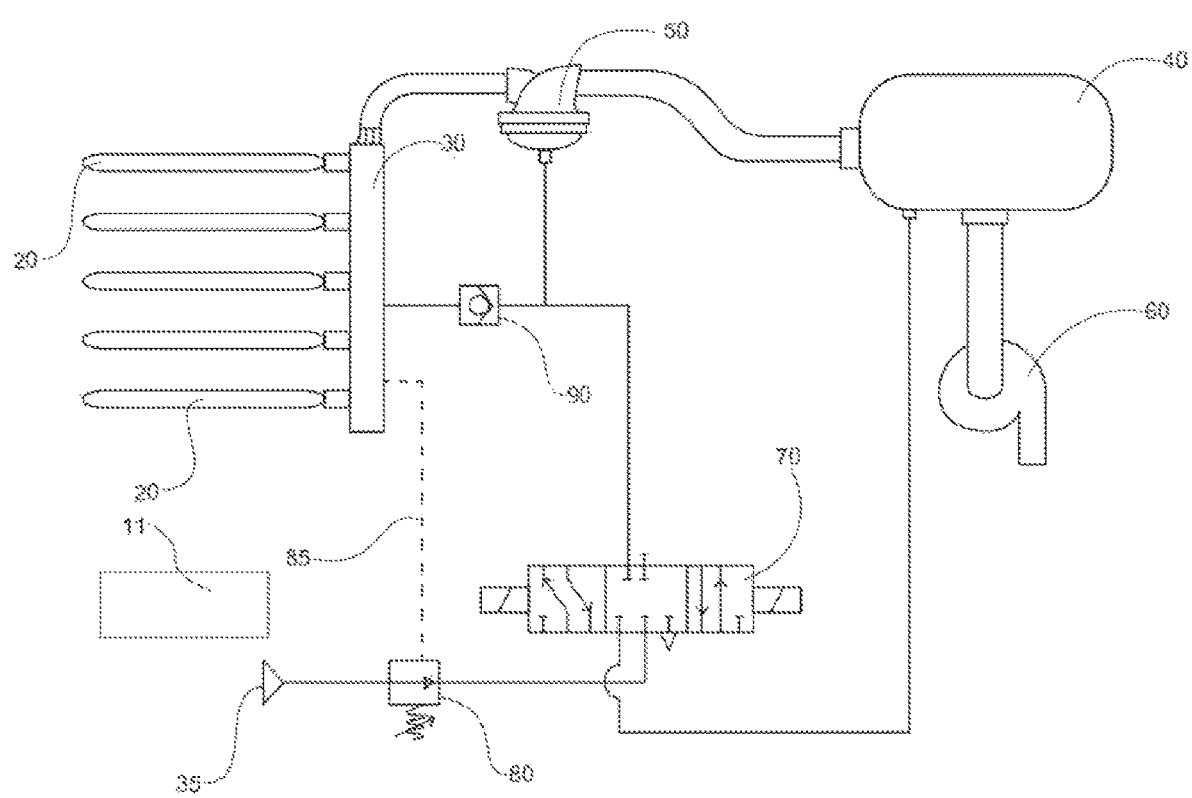
FIG. 2 is a schematic of an apparatus according to one preferred embodiment of the invention.

FIG. 2 shows a schematic of a case packing apparatus for loading articles into a case 11. As shown, the apparatus preferably includes two or more airbags 20 adapted to be positioned above the case 11 connected with respect to a vacuum reservoir 40. Although not shown in detail, the present apparatus is generally used in connection with a larger system summarized above that includes an infeed conveyor, or similar supply, and an outfeed conveyor, or similar transport, shown as reference numeral 12 in FIGS. 1A-1B. U.S. Pat. Nos. 4,709,539 and 4,835,946 describe such a larger system and are incorporated herein by reference.

The subject system preferably further utilizes a vacuum pump 60 to maintain a vacuum on the vacuum reservoir 40, as shown in FIG. 1. The vacuum pump 60 is preferably electrically driven. Because the vacuum pump 60 runs continuously it can have a smaller capacity than the current Venturi pump. In the prior art systems, the Venturi pump deflates the bags directly. With the present invention, the vacuum reservoir 40 and the vacuum pump 60 may operate together to enable a small capacity pump that removes air continuously. The vacuum reservoir 40 is sized to remove all the air in the airbags 20 and still maintain a vacuum to suck the airbags 20 flat.

As used herein, the airbags 20 are preferably positioned in parallel with respect to each other and connected through a manifold 30 to maintain a balanced air/vacuum distribution among the several airbags 20. The airbags 20 preferably comprise a fluid pressurizable bladder for engaging, upon inflation thereof, the sides of articles 20, as shown in FIGS. 1A and 1B. Airbags 20 are preferably constructed of fabric reinforced tubing having a slick surface finish, although any other suitable inflatable material could be used, such as rubber or the like. The airbags 20 are closed or sealed at one end and at an opposite end are connected to the manifold 30.

The manifold 30 connecting the airbags 20 is preferably configured to space and align the respective airbags 20 in a desired configuration and to provide a chamber within which the two or more airbags 20 may be inflated and deflated in a consistent manner. FIG. 2 shows an arrangement of five parallel airbags 20 connected with the manifold however any suitable arrangement of two or more airbags 20 is possible depending on the application.

The vacuum reservoir 40 is preferably positioned in fluid communication with an outlet of the manifold 30. The vacuum reservoir 40 is sized to permit evacuation of all airbags 20 in the system and still provide some additional vacuum following complete deflation. As such, the vacuum reservoir 40 preferably includes a greater air volume than the manifold 30.

A supply 35 of compressed gas, such as from a conventional air compressor, is additionally positioned in fluid communication with an inlet of the manifold 30. The supply 35 is preferably of sufficient capacity to quickly inflate the airbags 20 on demand. For example, a 100 psi compressor should be sufficient for many configurations of the current invention.

A valve 50 is preferably connected between the vacuum reservoir 40 and the manifold 30. Preferably, the valve 50 comprises a fast-acting valve chosen for speed, flow rate and weight. In particular, the valve 50 preferably comprises a diaphragm valve. The valve 50 is used to drain the airbags 20 into the vacuum reservoir 40. The valve 50 opens quickly and permits a high rate of flow, and is relatively small and lightweight. Other types of fast-acting valves including spool valves, ball valves and/or butterfly valves may be substituted for the diaphragm valve in certain applications. The valve 50 is preferably piloted through a solenoid valve 70 connected inline between the vacuum reservoir and the manifold 30 that controls inflation.

The operating pressure of the airbags is around 5 psi. The airbags 20 are preferably inflated through the solenoid valve 70 using compressed air from the supply 35 at around 100 psi, a supply pressure similar to existing systems. The pressure is preferably regulated to 5 psi via a feedback line 85 connected with a regulator 80 from the manifold 30 and further connected to the solenoid valve 70. This system allows for rapid inflation due to high pressure differential across the valves and piping.

A check valve 90 is preferably positioned in an inflation line from the solenoid valve 70 at the manifold 30. When the solenoid valve 70 shifts from pressure to vacuum, the air is held within the manifold 30 by this check valve 90. In this manner, the vacuum can be applied rapidly to the valve 50 to open it sooner. Without the check valve 90, there would be a potential delay as the pressure dropped enough to trigger the valve 50.

As such, according to one embodiment, a case packing apparatus for loading articles into a case, may include: a conveyor for conveying articles toward the case; two or more airbags 20 positioned above the case; a manifold 30 connecting the airbags 20; a vacuum reservoir 40 positioned in fluid communication with the manifold 30; a vacuum pump 60 connected with respect to the vacuum reservoir 40; a supply 35 of compressed gas positioned in fluid communication with the manifold 30; a valve 50 positioned between the vacuum reservoir 40 and the manifold 30; a check valve 90 positioned between the valve 50 and the manifold 30; a solenoid valve 70 positioned between the diaphragm valve 50, the supply 35 and the vacuum reservoir 40; and a feedback line 85 positioned between the manifold 30 and the supply 35.

The vacuum level and reservoir volume are sized using the combined gas law for isothermal process ($P_1V_1=P_2V_2$). The combined pressure must be less than atmospheric pressure for the airbags to be fully deflated. Note that a strong vacuum requires a smaller reservoir and a weak vacuum requires a larger reservoir.

$$Pc = \frac{PbVb + PrVr}{Vr}$$

where,
Pb=Pressure in air bags
Vb=Volume of air bags
Pr=Pressure in reservoir
Vr=Volume of reservoir
Pc=Combined Pressure.

The required vacuum pump flow rate can be calculated with the following formula:

$$q = \frac{Vr \ln\left(\frac{Pc}{Pr}\right)}{t}$$

where,
t=cycle time
q=volumetric flow rate.

A test rig was constructed and it was found that when using 9 air bags, deflation can occur in approximately 160 ms. This indicates a flow rate through the diaphragm valve into the reservoir of around 130 cfm, while the vacuum pump is pumping around 14 cfm continuously. Existing systems using a Venturi pump would deflate these same bags in almost 3 seconds while consuming roughly ten times the horsepower.

While in the foregoing specification this invention has been described in relation to certain preferred embodiments thereof, and many details have been set forth for purpose of illustration, it will be apparent to those skilled in the art that the subject invention is susceptible to additional embodiments and that certain of the details described herein can be varied considerably without departing from the basic principles of the invention.

The invention claimed is:

1. A case packing apparatus for loading articles into a case, the apparatus comprising:
    two or more airbags adapted to be positioned above the case;
    a manifold connecting the airbags;
    a vacuum reservoir positioned in fluid communication with the manifold;
    a valve positioned between the vacuum reservoir and the manifold;

a supply of compressed gas positioned in fluid communication with the manifold; and a solenoid valve positioned between the supply of compressed gas and the vacuum reservoir, wherein the solenoid valve is directly connected to the vacuum reservoir, wherein the solenoid valve actuates the valve, with vacuum pressure from the vacuum reservoir, to open and remove gas from the two or more airbags through the valve into the vacuum reservoir, and wherein the solenoid valve is also directly connected to the supply of compressed gas via a regulator, wherein the solenoid valve actuates the manifold, with the supply of compressed gas, to open and inflate two or more airbags with gas.

2. The case packing apparatus of claim 1 wherein the valve is one of a diaphragm valve, a spool valve, a ball valve and a butterfly valve.

3. The case packing apparatus of claim 2 wherein the valve comprises a diaphragm valve.

4. The case packing apparatus of claim 3 further comprising:
a check valve positioned between the diaphragm valve and the manifold.

5. The case packing apparatus of claim 1 further comprising:
a vacuum pump connected with respect to the vacuum reservoir.

6. The case packing apparatus of claim 1 further comprising:
a conveyor for conveying articles toward the case.

7. The case packing apparatus of claim 1 further comprising:
a feedback line positioned between the manifold and the supply.

8. The case packing apparatus of claim 1 wherein the vacuum reservoir includes a greater air volume than the manifold.

9. The case packing apparatus of claim 1 wherein the airbags are positioned in parallel relative to each other.

10. A case packing apparatus for loading articles into a case, the apparatus comprising:
a conveyor for conveying articles toward the case;
two or more airbags positioned above the case;
a manifold connecting the airbags;
a vacuum reservoir positioned in fluid communication with the manifold;
a vacuum pump connected with respect to the vacuum reservoir, wherein the vacuum pump is configured to continuously operate;
a supply of compressed gas positioned in fluid communication with the manifold;
a diaphragm valve positioned between the vacuum reservoir and the manifold;
a check valve positioned between the diaphragm valve and the manifold; and
a solenoid valve positioned in direct communication with: the vacuum reservoir, the check valve in fluid communication with the manifold, and a regulator in fluid communication with the supply of compressed gas;
wherein the solenoid valve is configured to open and remove gas from the two or more airbags through the diaphragm valve into the vacuum reservoir with vacuum pressure from the vacuum reservoir;
wherein the solenoid valve is also configured to open and inflate two or more airbags with gas through the manifold with the regulator from the supply of compressed gas; and
wherein the check valve is configured to hold at least a portion of the supply of compressed gas in the manifold while the solenoid valve actuates at least one of the vacuum reservoir and the regulator.

11. The case packing apparatus of claim 10 further comprising:
a feedback line positioned between the manifold and the supply.

12. The case packing apparatus of claim 1 wherein the vacuum reservoir includes a greater air volume than the manifold.

13. The case packing apparatus of claim 1 wherein the valve opens by vacuum from the vacuum reservoir through the solenoid valve.

14. The case packing apparatus of claim 13 wherein the two or more airbags are inflated by the compressed gas through the solenoid valve.

* * * * *